United States Patent
Rao

(10) Patent No.: US 10,242,461 B1
(45) Date of Patent: Mar. 26, 2019

(54) METHOD TO IMPROVE OVERLAY MAPPING OF OUT-OF-GAMUT

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Yang Rao, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 15/742,516

(22) PCT Filed: Nov. 25, 2017

(86) PCT No.: PCT/CN2017/112973
§ 371 (c)(1),
(2) Date: Jan. 7, 2018

(30) Foreign Application Priority Data

Oct. 23, 2017 (CN) .......................... 2017 1 0994596

(51) Int. Cl.
*G06T 7/90* (2017.01)

(52) U.S. Cl.
CPC ...... *G06T 7/90* (2017.01); *G06T 2207/10024* (2013.01)

(58) Field of Classification Search
CPC ......... G06T 3/0006; G06T 2207/10024; G06T 2207/20172; G06T 5/00; G06T 7/00;
(Continued)

(56) References Cited

U.S. PATENT DOCUMENTS 9,613,435 B1    4/2017  Eddins
2013/0050245 A1*  2/2013  Longhurst ................ H04N 9/67
                                                    345/590

(Continued)

FOREIGN PATENT DOCUMENTS

CN       104869378       8/2015
CN       106341574       1/2017

*Primary Examiner* — Xilin Guo
(74) *Attorney, Agent, or Firm* — Hauptman Ham, LLP

(57) ABSTRACT

The present disclosure relates a method to improve overlay mapping of out-of-gamut. The method includes: step 10, converting a RGB digital value to a L*a*b* value of a Lab color space; step 20, determining a hue plane where the color point P located, and further determining values of a hue angle H, a color saturation C, and a brightness L; step 30, determining a reference color point $P_i$ by combing intersections color point $P_C$ and color point $P_S$ with the color point $L_m$ and a parameter α; step 40, determining whether the color point P inside or outside a line $|L_mP_i|$; and step 50, converting a L*a*b* value into a RGB value in the target gamut. The method to improve the overlay mapping of out-of-gamut according to the present disclosure causes multiple colors to no longer be mapped to the same color point.

15 Claims, 5 Drawing Sheets

(58) Field of Classification Search
CPC ... G06T 7/0014; G06T 7/194; G09G 2360/16; G09G 5/377; G09G 5/397
See application file for complete search history.

(56) References Cited

U.S. PATENT DOCUMENTS

| | | | | |
|---|---|---|---|---|
| 2013/0271779 | A1* | 10/2013 | Suzuki | H04N 1/6061 |
| | | | | 358/1.9 |
| 2016/0133011 | A1* | 5/2016 | Nakajima | G06T 5/009 |
| | | | | 382/128 |
| 2016/0379595 | A1* | 12/2016 | Stauder | H04N 9/67 |
| | | | | 345/590 |

* cited by examiner

METHOD TO IMPROVE OVERLAY MAPPING OF OUT-OF-GAMUT

RELATED APPLICATIONS

The present application is a National Phase of International Application Number PCT/CN2017/112973, filed on Nov. 25, 2017, and claims the priority of China Application 201710994596.5, filed on Oct. 23, 2017.

FIELD OF THE DISCLOSURE

The present disclosure relates to a display technology field, and more particularly to a method to improve overlay mapping of out-of-gamut.

BACKGROUND OF THE DISCLOSURE

Gamut is a way to encode a color, as well as the sum of colors that a technical system can produce. In the display technology, due to the range of colors (i.e. gamut) that various color devices can display, Gamut Mapping techniques and algorithms are required for color image reproduction. Gamut mapping generally refers to mapping a source gamut of an input image signal to a target gamut suitable for a display device to display the image.

Color space, also known as color models, is used to describe color in some generally accepted ways. In order to describe colors more appropriately, the International Commission on Illumination (CIE) has proposed various color spaces such as RGB color space, XYZ color space, Lab color space, LCH color space and the like.

RGB (red, green and blue) color space is a color space defined according to the human eye, through the three basic colors of different degrees of superposition to produce a variety of different colors, usually, the numerical values of the three basic colors are all [0,255]. In the case of the existing display device, the input RGB digital value needs to be gamma-corrected, and the RGB digital value needs to be converted into the RGB optical value.

The XYZ color space is a color space composed of three elements of tristimulus values X, Y and Z. The tristimulus values X, Y and Z can be obtained by converting the RGB optical values, as we all know, the conversion relationship can generally be expressed as $$\begin{bmatrix} X \\ Y \\ Z \end{bmatrix} = M \times \begin{bmatrix} R \\ G \\ B \end{bmatrix},$$

wherein R, G, B are the RGB optical value, M is the particular transformation matrix. Correspondingly, an inverse transform relationship may be obtained by the inverse matrix of M.

Lab color space is a device-independent color space, which is a color space composed of three elements of L, a, and b; the L component in the Lab color space is used to represent the brightness of the pixel, in the range of [0,100], from pure black to pure white; a represents the range from red to green, the range of values is [127, −128]; b represents the range from yellow to blue, and the value range is [127, −128].

The XYZ tristimulus values can be converted into the L*a*b* value of the Lab color space by the formula:

$$L^* = 116 f\left(\frac{Y}{Y_n}\right) - 16$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(t) = \begin{cases} t^{1/3} & \left(t > \left(\frac{6}{29}\right)^3\right) \\ \frac{1}{3}\left(\frac{29}{6}\right)^2 t + \frac{4}{29} & \text{(others)} \end{cases}$$

when the maximum brightness normalized to 100, $X_n$, $Y_n$ and $Z_n$ are general defaulted as 95.047,100,108.883.

Accordingly, the L*a*b* value of the Lab color space can be converted into the XYZ tristimulus value by the formula:

$$f\left(\frac{Y}{Y_n}\right) = \frac{L+16}{116}$$

$$f\left(\frac{X}{X_n}\right) = \frac{a}{500} + f\left(\frac{Y}{Y_n}\right)$$

$$f\left(\frac{Z}{Z_n}\right) = f\left(\frac{Y}{Y_n}\right) - b/200$$

$$t = \begin{cases} f(t)^\wedge 3 & \left(f(t) > \frac{6}{29}\right) \\ \left(f(t) - \frac{4}{29}\right) / \left(\left(\frac{1}{3}\right) * (29/6)^\wedge 2\right) & \text{(others)} \end{cases}$$

The LCH color space is a color space composed of three elements of L, C and H. L represents the brightness and is the same as L* in the Lab color space. C is the color saturation and H is the hue angle.

As shown in FIG. 1, it is a constant hue flat view of the Lab color space. Any color point P and brightness axis in the Lab color space can be used as a plane to convert the three-dimensional pace into a two-dimensional plane. The color point P hue angle $$H = \arctan\frac{b*}{a*},$$

the plane coordinates (C, L) can be used to measure the color point position, at this time:

$$H = \arctan\frac{b*}{a*}$$

$$C = \sqrt{a*^2 + b*^2}$$

$$L = L^*$$

In the FIG. 1, The vertical axis of the two-dimensional plane CL represents the brightness L, the horizontal axis represents the color saturation C, the position of the color point P is measured by coordinates (C, L), the color point P is located in the gamut defined by the color point D and the origin O and L axis.

For the gamut mapping algorithm, in the process of mapping the large gamut to the small gamut, it can be analyzed in conjunction with the constant hue plane (LC section) of the Lab color space. The common algorithm for the color points outside the small gamut are mapped to a small gamut boundary, there will always be a region or a line segment mapped to the same point phenomenon, that is, overlay mapping problem. Directly leads to the level of image loss detail after mapping, resulting in the phenomenon of halo noise.

For the ultra-gamut problem, the traditional algorithm outputs the color in the gamut directly as it is, cutting all the colors outside the gamut to the target color gamut boundary. There are two common methods as shown in FIG. 2 and FIG. 3.

As shown in FIG. 2, FIG. 2 is an algorithm diagram of the HPMINDE, the vertical axis represents the brightness L, the horizontal axis represents the color saturation C, the triangular area enclosed by the color point D and the origin O and the L axis represents the source gamut, the triangular area enclosed by the color point T and the origin O and L axis represents the target gamut. The mapping principle of the method is to ensure that the color difference value of the color before and after the mapping is the minimum: the color of the ultra-gamut is mapped to the target gamut boundary according to the principle of the minimum color difference, that is, the color point P' at the shortest Euclidean distance.

As shown in FIG. 3, FIG. 3 is an algorithm diagram of a gamut mapped along a fixed point $L_{focal}$ direction, and the triangular area enclosed by the color point D and the origin O and the L axis represents the source gamut, the triangular area inside the source gamut represents the target gamut. The mapping principle of this method is to map the color of the ultra-gamut along the direction of the fixed point $L_{focal}$ on the brightness axis and map the color point P of the ultra-gamut to the target gamut boundary sequentially to obtain the color point P'.

The features of the existing method are as follows: the color point in the gamut is output as it is to ensure accurate color rendering in the gamut; the color point of out-of-gamut is mapped on the gamut boundary according to different principles. The disadvantages of the existing methods are as follows: in Method 1, the color in the K region will be mapped to the cusp T, and the colors on the midline PP' in Method 2 are all mapped to the point P'. Mapping the color of the image in this area loses the level of detail, creating blurring and Halo noise.

SUMMARY OF THE DISCLOSURE

Therefore, an object of the present disclosure is to provide a method to improve overlay mapping of out-of-gamut and propose a simple and easy-to-implement gamut mapping method to improve the color of the mapped image and increase the level of detail.

In order to achieve the above object, the present disclosure provides a method to improve overlay mapping of out-of-gamut, including:

step 10, converting a RGB digital value of a color point P in a source gamut to a L*a*b* value of a Lab color space;

step 20, determining a hue plane where the color point P located by the L*a*b* value, and further determining values of a hue angle H, a color saturation C, and a brightness L of the color point P;

step 30, serving intersections of a line defined by the color point P and a color point $L_m$ on a brightness axis of the hue plane, and a boundary of a target gamut and a boundary of the source gamut as a color point $P_C$ and a color point $P_S$ respectively, and determining a reference color point $P_i$ by combing with the color point $L_m$ and a parameter α:

$$L_{P_i}=\alpha(L_{L_m}-L_{P_C})+L_{P_C}$$

$$C_{P_i}=\alpha(C_{L_m}-C_{P_C})+C_{P_C}$$

wherein, the parameter α is 0~1;

step 40, determining whether the color point P inside a line $|L_mP_i|$ or outside the $|L_mP_i|$; if it is inside, the color point P is still the color point P after mapping to the target gamut, and the process goes to step 50; if it is outside, the color point P is mapped to the target gamut as a color point P':

$$L_{P'} = \frac{(L_{P_C} - L_{P_i})(L_P - L_{P_i})}{(L_{P_S} - L_{P_i})} + L_{P_i},$$

$$C_{P'} = \frac{(C_{P_C} - C_{P_i})(C_P - C_{P_i})}{(C_{P_S} - C_{P_i})} + C_{P_i};$$

step 50, converting a L*a*b* value of the color point P mapped to the target gamut into a RGB value in the target gamut.

Wherein the color point $L_m$ is a midpoint of a maximum brightness on the brightness axis of the hue plane.

Wherein the parameter α is 0.

Wherein the parameter α is 1.

Wherein the parameter α is greater than 0 and less than 1.

Wherein the step 10 includes:

step 11, inputting a RGB numerical value of the color point P in the source gamut;

step 12, converting the RGB numerical value into a RGB optical value by gamma correction;

step 13, converting the RGB optical value into a XYZ tristimulus value by a conversion matrix;

step 14, converting the XYZ tristimulus value into the L*a*b* value of the Lab color space.

Wherein the gamma correction uses the gamma 2.2 standard.

Wherein the step 50 includes:

step 51, converting the L*a*b value into a XYZ tristimulus value;

step 52, converting the XYZ tristimulus value into a RGB optical value by an inverse conversion matrix;

step 53, converting the RGB optical value into a RGB numerical value by gamma correction;

step 54, outputting the RGB numerical value of the color point P mapped to the target gamut.

Wherein the gamma correction uses the gamma 2.2 standard.

Wherein the source gamut is sRGB gamut.

The present disclosure further provides a method to improve overlay mapping of out-of-gamut, including:

step 10, converting a RGB digital value of a color point P in a source gamut to a L*a*b* value of a Lab color space;

step 20, determining a hue plane where the color point P located by the L*a*b* value, and further determining values of a hue angle H, a color saturation C, and a brightness L of the color point P;

step 30, serving intersections of a line defined by the color point P and a color point $L_m$ on a brightness axis of the hue plane, and a boundary of a target gamut and a boundary of the source gamut as a color point $P_C$ and a color point $P_S$ respectively, and determining a reference color point $P_i$ by combing with the color point $L_m$ and a parameter α:

$$L_{P_i}=\alpha(L_{L_m}-L_{P_C})+L_{P_C}$$

$$C_{P_i}=\alpha(C_{L_m}-C_{P_C})+C_{P_C}$$

wherein, the parameter α is 0~1;

step 40, determining whether the color point P inside a line $|L_mP_i|$ or outside the $|L_mP_i|$; if it is inside, the color point P is still the color point P after mapping to the target gamut, and the process goes to step 50; if it is outside, the color point P is mapped to the target gamut as a color point P':

$$L_{P'} = \frac{(L_{P_c} - L_{P_i})(L_P - L_{P_i})}{(L_{P_s} - L_{P_i})} + L_{P_i},$$

$$C_{P'} = \frac{(C_{P_c} - C_{P_i})(C_P - C_{P_i})}{(C_{P_s} - C_{P_i})} + C_{P_i};$$

step 50, converting a L*a*b* value of the color point P mapped to the target gamut into a RGB value in the target gamut;

wherein the color point $L_m$ is a midpoint of a maximum brightness on the brightness axis of the hue plane;

wherein the step 10 includes:

step 11, inputting a RGB numerical value of the color point P in the source gamut;

step 12, converting the RGB numerical value into a RGB optical value by gamma correction;

step 13, converting the RGB optical value into a XYZ tristimulus value by a conversion matrix;

step 14, converting the XYZ tristimulus value into the L*a*b* value of the Lab color space;

wherein the gamma correction uses the gamma 2.2 standard;

wherein the step 50 includes:

step 51, converting the L*a*b value into a XYZ tristimulus value;

step 52, converting the XYZ tristimulus value into a RGB optical value by an inverse conversion matrix;

step 53, converting the RGB optical value into a RGB numerical value by gamma correction;

step 54, outputting the RGB numerical value of the color point P mapped to the target gamut;

wherein the gamma correction uses the gamma 2.2 standard.

In conclusion, the method to improve overlay mapping of out-of-gamut in the present disclosure enables multiple colors to no longer be mapped to the same color point, but maps to multiple color points to largely alleviate the phenomenon that multiple colors are mapped to the same color point; the parameter α can be used to strike a balance between detail and color difference; after the different out-of-gamut treated by the mapping algorithm, the level and the difference are opened, and the image details are more abundant.

BRIEF DESCRIPTION OF THE DRAWINGS

The technical solutions of the present disclosure and other beneficial effects will be apparent from the following detailed description of specific embodiments of the present disclosure with reference to the accompanying drawings. In the figures.

DETAILED DESCRIPTION OF PREFERRED EMBODIMENTS

Figure 1:
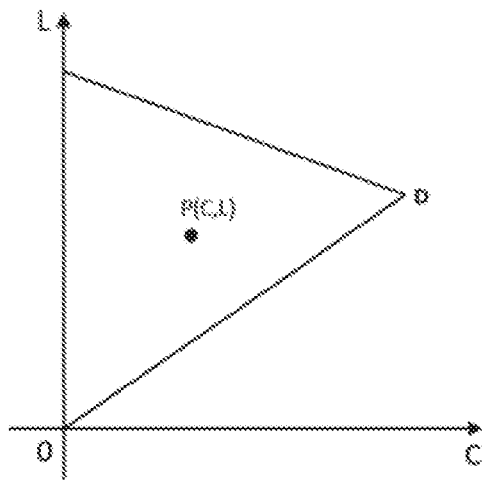
FIG. 1 is a schematic diagram of a constant hue of Lab color space.
Figure 2:
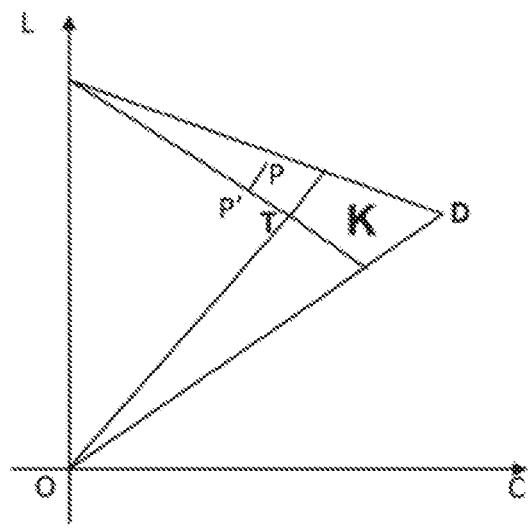
FIG. 2 is an algorithm diagram of the HPMINDE.
Figure 3:
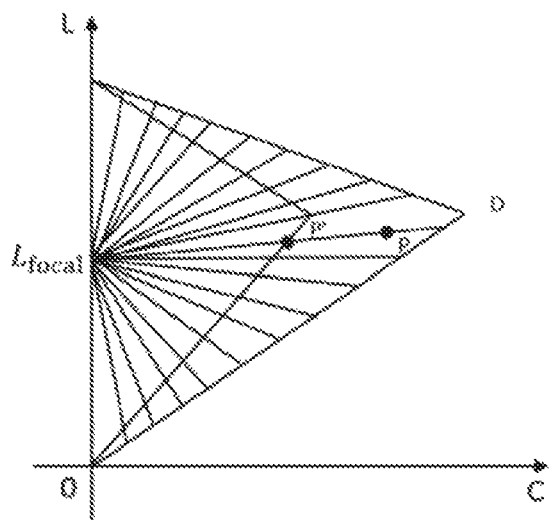
FIG. 3 is an algorithm diagram of a gamut mapped along a fixed point $L_{focal}$ direction.
Figure 4:
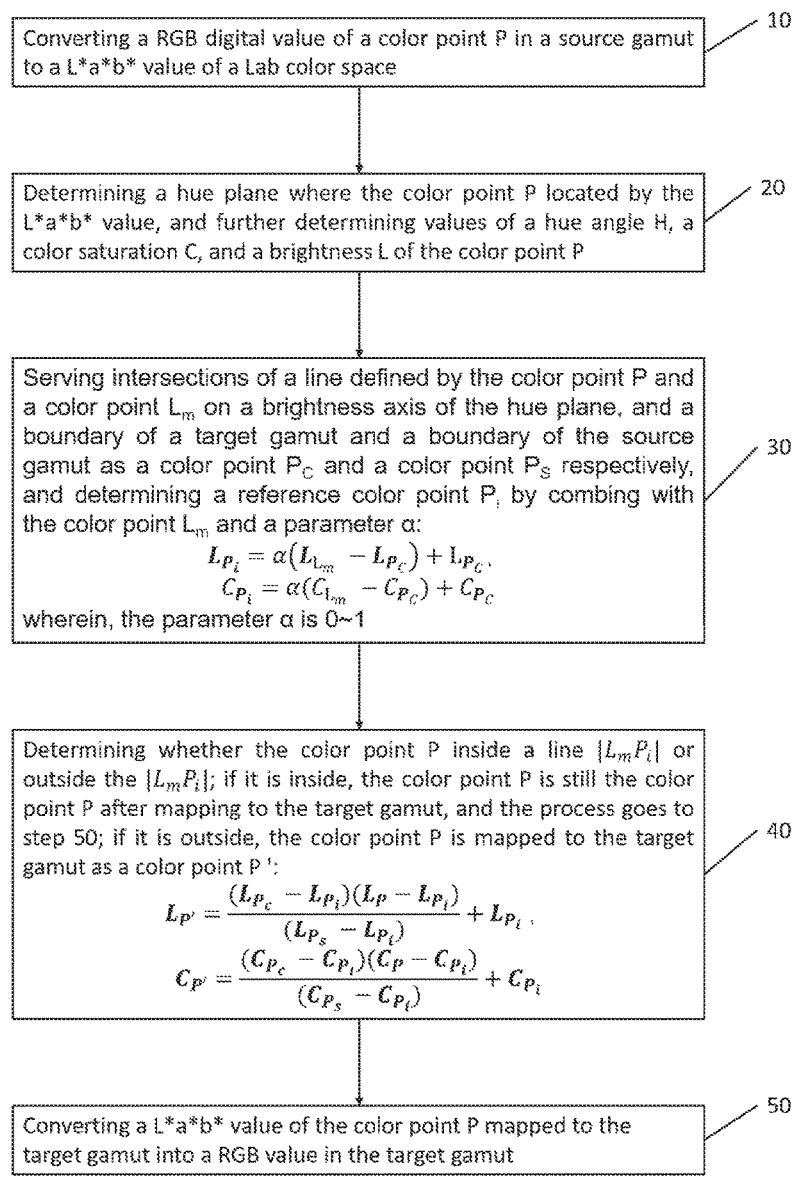
FIG. 4 is a flowchart of the method to improve overlay mapping of out-of-gamut according to the present disclosure.

As shown in FIG. 4, FIG. 4 is a flowchart of the method to improve overlay mapping of out-of-gamut according to the present disclosure. The method of the present disclosure mainly includes:

step 10, converting a RGB digital value of a color point P in a source gamut to a L*a*b* value of a Lab color space;

step 20, determining a hue plane where the color point P located by the L*a*b* value, and further determining values of a hue angle H, a color saturation C, and a brightness L of the color point P;

step 30, serving intersections of a line defined by the color point P and a color point $L_m$ on a brightness axis of the hue plane, and a boundary of a target gamut and a boundary of the source gamut as a color point $P_C$ and a color point $P_S$ respectively, and determining a reference color point $P_i$ by combing with the color point $L_m$ and a parameter α:

$$L_{P_i} = \alpha(L_{L_m} - L_{P_C}) + L_{P_C}$$

$$C_{P_i} = \alpha(C_{L_m} - C_{P_C}) + C_{P_C}$$

wherein, the parameter α is 0~1;

step 40, determining whether the color point P inside a line $|L_m P_i|$ or outside the $|L_m P_i|$; if it is inside, the color point P is still the color point P after mapping to the target gamut, and the process goes to step 50; if it is outside, the color point P is mapped to the target gamut as a color point P':

$$L_{P'} = \frac{(L_{P_c} - L_{P_i})(L_P - L_{P_i})}{(L_{P_s} - L_{P_i})} + L_{P_i},$$

$$C_{P'} = \frac{(C_{P_c} - C_{P_i})(C_P - C_{P_i})}{(C_{P_s} - C_{P_i})} + C_{P_i};$$

step 50, converting a L*a*b* value of the color point P mapped to the target gamut into a RGB value in the target gamut.

Wherein the color point $L_m$ is a midpoint of a maximum brightness on the brightness axis of the hue plane.

Wherein the parameter α may be equal to 0, may be equal to 1 or may be any value greater than 0 and less than 1.

Wherein the step 10 specifically includes:

step 11, inputting a RGB numerical value of the color point P in the source gamut;

step 12, converting the RGB numerical value into a RGB optical value by gamma correction;

step 13, converting the RGB optical value into a XYZ tristimulus value by a conversion matrix;

step 14, converting the XYZ tristimulus value into the L*a*b* value of the Lab color space.

Wherein the step 50 specifically includes:

step 51, converting the L*a*b value into a XYZ tristimulus value;

step 52, converting the XYZ tristimulus value into a RGB optical value by an inverse conversion matrix:

step 53, converting the RGB optical value into a RGB numerical value by gamma correction;

step 54, outputting the RGB numerical value of the color point P mapped to the target gamut.

Wherein the gamma correction uses the gamma 2.2 standard.

In the gamut mapping process of the present disclosure, the out-of-gamut is mapped to a small gamut internally to enhance the level of detail of the color after the mapping. Based on the parameter α to determine a reference point of the reference color point, for the color point outside the reference point, the mapping is proportionally compressed by combining the two boundary points and the reference point; it is also possible to strike a balance between detail and color difference by changing the parameter α. The present disclosure can effectively open the color hierarchy of the mapped image and enrich the detail of the image.

Figure 5:
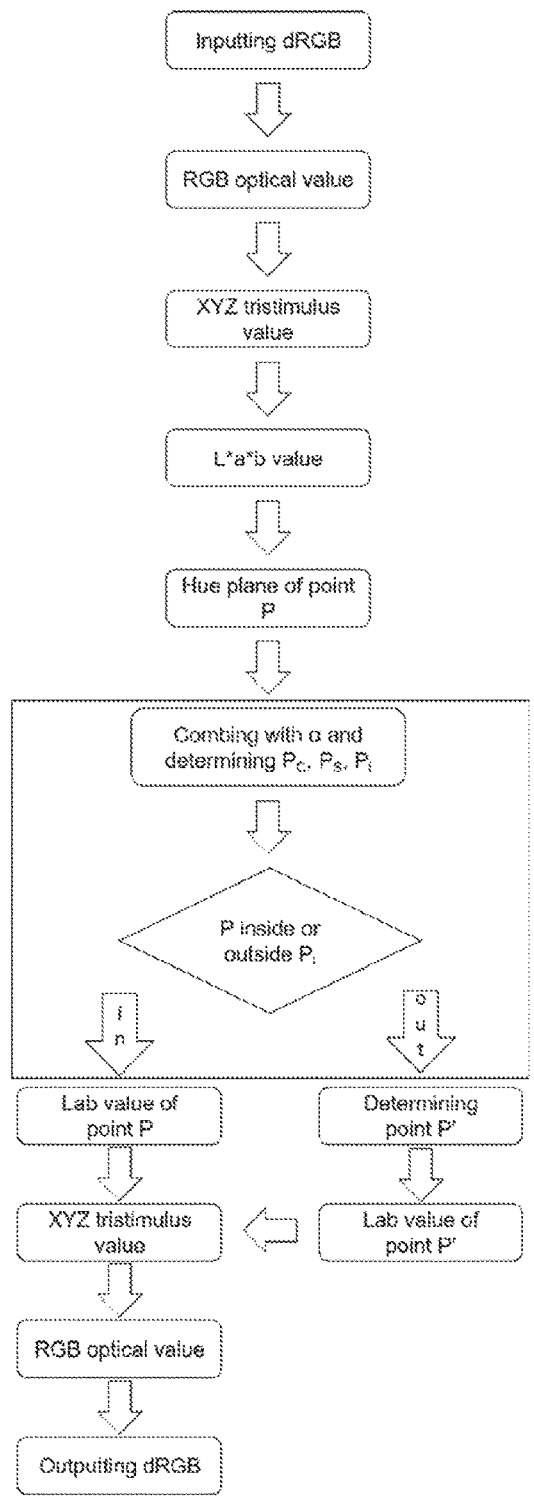
FIG. 5 is an algorithm block diagram of a preferred embodiment of the method to improve overlay mapping of out-of-gamut according to the present disclosure.
Figure 6:
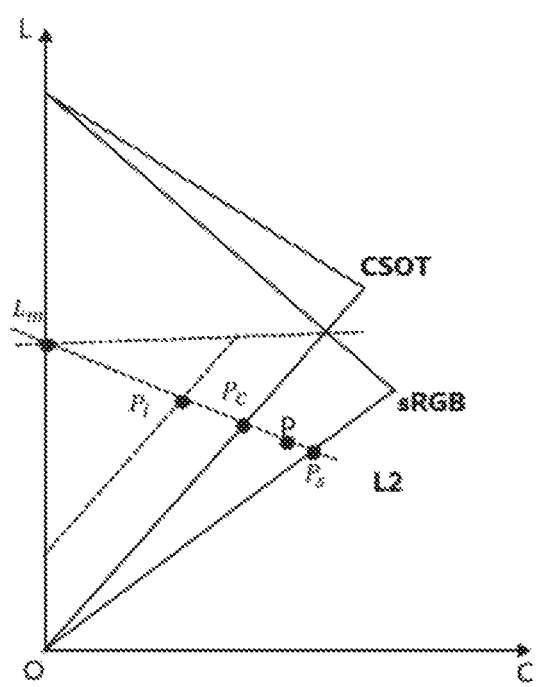
FIG. 6 is a schematic diagram of mapping of a preferred embodiment of the method to improve overlay mapping of out-of-gamut according to the present disclosure.

Referring to FIG. 5 and FIG. 6, FIG. 5 is an algorithm block diagram of a preferred embodiment of the method to improve overlay mapping of out-of-gamut according to the present disclosure; FIG. 6 is a schematic diagram of mapping of a preferred embodiment of the method to improve overlay mapping of out-of-gamut according to the present disclosure. FIG. 6 shows the process of determining the mapping path of the color point P from the source gamut sRGB to the target gamut CSOT. With reference to FIG. 5 and FIG. 6, the gamut mapping algorithm for mitigating the phenomenon of overlay mapping of out-of-gamut obtained according to the present disclosure mainly includes:

1. inputting the numerical value dRGB of the color point P in the sRGB gamut of the source gamut;
2. converting the numerical value dRGB into the RGB optical value by Gamma2.2;
3. converting the RGB optical value into the XYZ tristimulus value by the transformation matrix;
4. converting the XYZ tristimulus value into the L*a*b* value in the Lab color space;
5. determining the hue plane where the color point P located through the L*a*b* value, and further determining the H, C, L value;
6. determining the mapping path from the color point P to the target gamut: determining the color point $P_C$ on the boundary of the target gamut and the color point $P_S$ on the boundary of the target gamut through the straight line defined by the color point P and $L_m$, and determining the reference color point $P_i$ by combing with the midpoint of the maximum brightness $L_m$ and the parameter α∈[0, 1];

$$L_{P_i}=\alpha(L_{L_m}-L_{P_C})+L_{P_C}$$

$$C_{P_i}=\alpha(C_{L_m}-C_{P_C})+C_{P_C}$$

In the present embodiment, $L_m$ is defined as the midpoint of the L-axis maximum brightness of the CL plane, and other fixed points on the L-axis may be selected.

7. determining whether the color point P inside a line $|L_m P_i|$ or outside the $|L_m P_i|$; if it is inside?
   inside: entering to process 8;
   outside:

$$L_{P'}=\frac{(L_{P_c}-L_{P_i})(L_P-L_{P_i})}{(L_{P_s}-L_{P_i})}+L_{P_i}$$

$$C_{P'}=\frac{(C_{P_c}-C_{P_i})(C_P-C_{P_i})}{(C_{P_s}-C_{P_i})}+C_{P_i}$$

8. converting the L*a*b* value into the XYZ tristimulus value by the formula;
9. converting the XYZ tristimulus values into the RGB optical value by the inverse of the transformation matrix;
10. converting the RGB optical value into the dRGB numerical value by Gamma2.2.
11. outputting the numerical value of the color point P mapping in the target gamut CSOT.

In summary, the method to improve overlay mapping of out-of-gamut according to the present disclosure causes multiple colors to no longer be mapped to the same color point but maps to multiple color points; the parameter α can be used to strike a balance between detail and color difference; after the different out-of-gamut mapping algorithm, the level and the difference is opened, and the image details are more abundant.

It should be understood by those skilled in the art that various modifications and variations can be made in the light of the technical solutions and technical concepts of the present disclosure. All such changes and modifications shall fall within the protection scope of the appended claims of the present disclosure.

What is claimed is:

1. A method to improve overlay mapping of out-of-gamut, comprising:
   step 10, converting a RGB digital value of a color point P in a source gamut to a L*a*b* value of a Lab color space;
   step 20, determining a hue plane where the color point P located by the L*a*b* value, and further determining values of a hue angle H, a color saturation C, and a brightness L of the color point P;
   step 30, serving intersections of a line defined by the color point P and a color point $L_m$ on a brightness axis of the hue plane, and a boundary of a target gamut, and a boundary of the source gamut as a color point $P_C$ and a color point $P_S$ respectively, and determining a reference color point $P_i$ by combing with the color point $L_m$ and a parameter α:

$$L_{P_i}=\alpha(L_{L_m}-L_{P_C})+L_{P_C}$$

$$C_{P_i}=\alpha(C_{L_m}-C_{P_C})+C_{P_C}$$

wherein, the parameter α is 0~1;
   step 40, determining whether the color point P inside a line $|L_m P_i|$ or outside the $|L_m P_i|$; if it is inside, the color point P is still the color point P after mapping to the target gamut, and the process goes to step 50; if it is outside, the color point P is mapped to the target gamut as a color point P':

$$L_{P'}=\frac{(L_{P_c}-L_{P_i})(L_P-L_{P_i})}{(L_{P_s}-L_{P_i})}+L_{P_i},$$

$$C_{P'}=\frac{(C_{P_c}-C_{P_i})(C_P-C_{P_i})}{(C_{P_s}-C_{P_i})}+C_{P_i};$$

step 50, converting a L*a*b* value of the color point P mapped to the target gamut into a RGB value in the target gamut.

2. The method to improve overlay mapping of out-of-gamut according to claim 1, wherein the color point $L_m$ is a midpoint of a maximum brightness on the brightness axis of the hue plane.

3. The method to improve overlay mapping of out-of-gamut according to claim 1, wherein the parameter α is 0.

4. The method to improve overlay mapping of out-of-gamut according to claim 1, wherein the parameter α is 1.

5. The method to improve overlay mapping of out-of-gamut according to claim 1, wherein the parameter α is greater than 0 and less than 1.

6. The method to improve overlay mapping of out-of-gamut according to claim 1, wherein the step 10 comprises:
   step 11, inputting a RGB numerical value of the color point P in the source gamut;
   step 12, converting the RGB numerical value into a RGB optical value by gamma correction;
   step 13, converting the RGB optical value into a XYZ tristimulus value by a conversion matrix;
   step 14, converting the XYZ tristimulus value into the L*a*b* value of the Lab color space.

7. The method to improve overlay mapping of out-of-gamut according to claim 6, wherein the gamma correction uses the gamma 2.2 standard.

8. The method to improve overlay mapping of out-of-gamut according to claim 1, wherein the step 50 comprises:
   step 51, converting the L*a*b value into a XYZ tristimulus value;
   step 52, converting the XYZ tristimulus value into a RGB optical value by an inverse conversion matrix;
   step 53, converting the RGB optical value into a RGB numerical value by gamma correction;
   step 54, outputting the RGB numerical value of the color point P mapped to the target gamut.

9. The method to improve overlay mapping of out-of-gamut according to claim 8, wherein the gamma correction uses the gamma 2.2 standard.

10. The method to improve overlay mapping of out-of-gamut according to claim 1, wherein the source gamut is sRGB gamut.

11. A method to improve overlay mapping of out-of-gamut, comprising:
    step 10, converting a RGB digital value of a color point P in a source gamut to a L*a*b* value of a Lab color space;
    step 20, determining a hue plane where the color point P located by the L*a*b* value, and further determining values of a hue angle H, a color saturation C, and a brightness L of the color point P;
    step 30, serving intersections of a line defined by the color point P and a color point $L_m$ on a brightness axis of the hue plane, and a boundary of a target gamut and a boundary of the source gamut as a color point $P_C$ and a color point $P_S$ respectively, and determining a reference color point $P_i$ by combing with the color point $L_m$ and a parameter α:

$$L_{P_i} = \alpha(L_{L_m} - L_{P_C}) + L_{P_C}$$

$$C_{P_i} = \alpha(C_{L_m} - C_{P_C}) + C_{P_C}$$

wherein, the parameter α is 0~1;

step 40, determining whether the color point P inside a line $|L_m P_i|$ or outside the $|L_m P_i|$; if it is inside, the color point P is still the color point P after mapping to the target gamut, and the process goes to step 50; if it is outside, the color point P is mapped to the target gamut as a color point P':

$$L_{P'} = \frac{(L_{P_C} - L_{P_i})(L_P - L_{P_i})}{(L_{P_S} - L_{P_i})} + L_{P_i},$$

$$C_{P'} = \frac{(C_{P_C} - C_{P_i})(C_P - C_{P_i})}{(C_{P_S} - C_{P_i})} + C_{P_i};$$

step 50, converting a L*a*b* value of the color point P mapped to the target gamut into a RGB value in the target gamut;
wherein the color point $L_m$ is a midpoint of a maximum brightness on the brightness axis of the hue plane;
wherein the step 10 comprises:
step 11, inputting a RGB numerical value of the color point P in the source gamut;
step 12, converting the RGB numerical value into a RGB optical value by gamma correction;
step 13, converting the RGB optical value into a XYZ tristimulus value by a conversion matrix;
step 14, converting the XYZ tristimulus value into the L*a*b* value of the Lab color space;
wherein the gamma correction uses the gamma 2.2 standard;
wherein the step 50 comprises:
step 51, converting the L*a*b value into a XYZ tristimulus value;
step 52, converting the XYZ tristimulus value into a RGB optical value by an inverse conversion matrix;
step 53, converting the RGB optical value into a RGB numerical value by gamma correction;
step 54, outputting the RGB numerical value of the color point P mapped to the target gamut;
wherein the gamma correction uses the gamma 2.2 standard.

12. The method to improve overlay mapping of out-of-gamut according to claim 11, wherein the parameter α is 0.

13. The method to improve overlay mapping of out-of-gamut according to claim 11, wherein the parameter α is 1.

14. The method to improve overlay mapping of out-of-gamut according to claim 11, wherein the parameter α is greater than 0 and less than 1.

15. The method to improve overlay mapping of out-of-gamut according to claim 11, wherein the source gamut is sRGB gamut.

* * * * *